Dec. 13, 1966           KAIJI NEGORO          3,291,874
METHOD AND APPARATUS FOR FORMING ARTICLES FROM
PLASTIC SHEET MATERIAL

Filed March 22, 1963                            2 Sheets-Sheet 1

INVENTOR.
KAIJI NEGORO
BY
Trent Lockwood, Greenawalt
& Dewey
ATTYS.

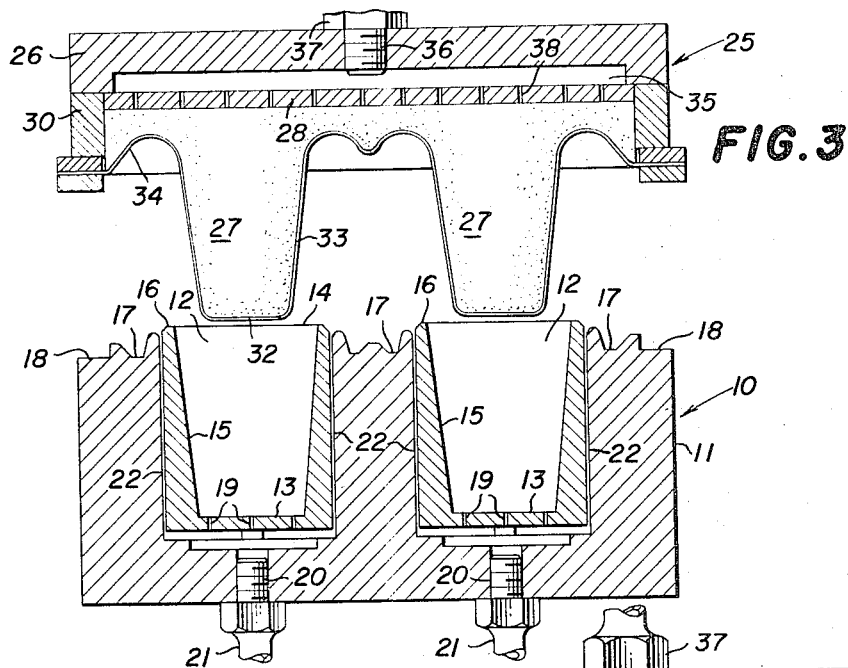

United States Patent Office 3,291,874
Patented Dec. 13, 1966

3,291,874
METHOD AND APPARATUS FOR FORMING ARTICLES FROM PLASTIC SHEET MATERIAL
Kaiji Negoro, Clarendon Hills, Ill., assignor to Continental Can Company, Inc., New York, N.Y., a corporation of New York
Filed Mar. 22, 1963, Ser. No. 267,082
2 Claims. (Cl. 264—89)

This invention relates to the fabrication of articles from thermoplastic resin sheets and is more particularly concerned with improvements in a method and apparatus for forming deep drawn shapes, by a plug assist vacuum and/or pressure forming operation, so as to provide a more uniform wall thickness than heretofore obtainable.

The fabrication of generally concave hollow articles from sheets of thermoplastic resin by vacuum and/or pressure forming operations employing hollow forming or shaping molds or female dies and cooperating plug assist members or male dies is well known and offers an economical and rapid method for fabricating plastic articles from sheet materials without the use of the high pressures and temperatures required for injection molding. Generally, the procedure followed in these sheet forming processes comprises clamping a sheet of thermoplastic resin in a frame, softening it by heating, usually by means of radiant heat, placing the softened sheet over hollowed out cavities in the forming mold or die which have the shape of the desired articles, preliminarily drawing the sheet over the plug assist members by moving the latter against the softened sheet and partially into the cavities, stripping the partially formed sheet from the plug assist members and transporting it to the forming die surfaces by evacuation of the air trapped between the sheet and the cavity walls through a number of small ports or pores in the walls and finally setting the sheet in the shape of the cavities in the forming die by cooling, the latter being accomplished by heat transfer from the hot resin to the die on the one side of the sheet and to the atmosphere on the other side thereof.

While the process described has been successfully used commercially, some difficulties have been encountered. The movement of the plug assist against the softened sheet and then into the cavity results in a mechanical stretching of the sheet material and the sheet material is distributed over the plug surface with fairly uniform thickness since the softened sheet will slip over the plug surface when the latter is covered with the proper material and maintained at the proper temperature. The stretching operation of the plug assist can be fairly successful with proper selection of materials and so long as uniform temperature is maintained throughout the sheet. However, any non-uniformity which develops in the temperature of the sheet results in uneven stretching with resultant non-uniform thickness in the wall structure. Temperature variations in the heated sheet may, of course, result from a number of different conditions. Not infrequently, with the apparatus heretofore employed, the sheet is chilled in the area or areas adjacent the edge of the cavity in the forming mold, due to its being dragged across the edge of the mold as the assist plug is moved into the cavity, resulting in portions of the sheet, which are to form the margins of the article or articles, being prematurely cooled so as to resist stretching and leaving an undesirable thickness in the marginal portions of the article. This occurs particularly where multiple cavity dies are employed due to the tendency of the hot sheet to sag to an uneven extent particularly in the portions thereof which are spaced from the edge clamps. Numerous efforts have been made to provide a solution of this problem of premature cooling due to dragging of portions of the sheet over the edges of the cavities but none of them have been entirely successful. It is the general object, therefore, of the present invention to provide a method and apparatus for molding deep drawn shapes from thermoplastic resin sheets wherein special provision is made for preventing the sheet material from being dragged over the edges of the mold which define the openings to the cavities as the forming of the sheet is initiated by insertion of the plug assists into the cavities.

It is a more specific object of the invention to provide a molding process for fabricating deep drawn shapes from thermoplastic resin sheets wherein the sheet is initially shaped on a plug assist and thereafter stripped from the plug assist by differential pressure and formed into final shape in a mold cavity which is characterized by employing a plug assist having a recess in the areas which are opposite the edges of the mold defining the cavity therein so that when the plug assist is moved into the cavity for transfer of the partially formed sheet to the walls of the cavity, all portions of the sheet which are to be finally shaped in the cavity will be held clear of contact with the mold until the transfer operation is effected.

It is a further object of the invention to provide a method and apparatus for fabricating deep drawn hollow articles from sheets of thermoplastic resin material wherein the resin sheets in a hot moldable state are initially shaped on plug assist members and thereafter moved into mold cavities and transferred to the walls of the latter by differential pressure with each plug assist having hollowed out areas extending around its base into which portions of the sheet which form the margins of the article in its final condition are initially drawn so as to prevent these portions of the sheet from being dragged across the edges of the shaping molds thereby eliminating premature chilling of the hot sheet and resulting in a more uniform wall structure in the final form of the article.

These and other objects and advantages of the invention will be apparent from the accompanying description of the applicant's method and the molding or forming apparatus which is illustrated in the accompanying drawings for practicing the method wherein:

FIGURE 3 is a cross section similar to FIGURE 1 illustrating a subsequent step in the method which results in the initial shaping of the articles on the plug assist members;

FIGURE 4 is a cross section similar to FIGURE 1 with the plug assist members having been lowered into the cavities in the forming dies in position for stripping the initially formed sheet therefrom; and FIGURE 5 is a cross section similar to FIGURE 1 with the sheet stripped from the plug assists and given its final shape in the cavities of the molding dies.

Figure 1:
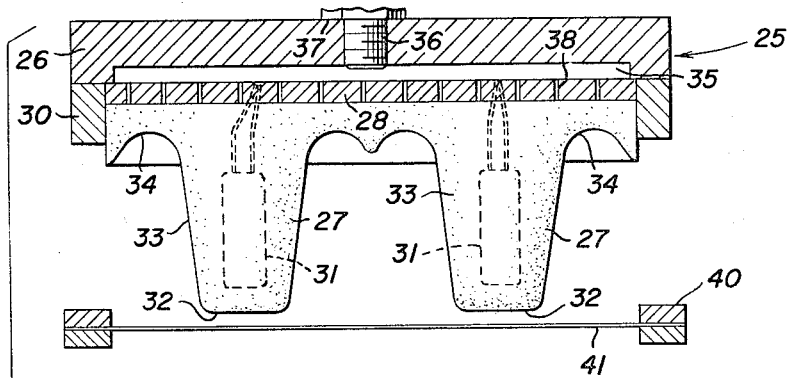
FIGURE 1 is a vertical section through a pair of forming dies or molds which are suitable for practicing the method of the present invention, the dies being shown in vertically separated relation with a sheet of thermoplastic resin material mounted in a clamping frame between the same.

Referring to the drawings, the invention comprises a process for deep drawn, vacuum and/or pressure forming of generally concave shapes from sheets of a thermoplastic resin which sheets have been softened by heating to a temperature above the softening point of the resin and in which the dies employed may take the form shown in the drawings.

The lowermost molding member or forming die 10 comprises a supporting base plate 11 having one or more article forming cavities 12 therein. Two of these cavities 12 which are of identical form are illustrated. However, other shapes or forms may be provided when it is desired to produce articles of a different shape. Each of the cavities 12 has a bottom surface 13 with a base diameter which is less than the diameter of the cavity opening or entrance 14, it being understood that by base diameter is meant the maximum linear dimension across the center of the base, whether or not the base is circular. The side walls 15 of the cavity taper upwardly and terminate at the upper edge 16 which defines the top opening or entrance 14 to the cavity 12. The cavity 12 may be truncated cone shaped, as shown, or any other desired shape which will permit removal of the article after it is given its final shape by contact with the walls of the cavity. Each of the cavities 12 may be surrounded at the entrance thereof by a recess or groove 17 in the uppermost face 18 of the die support plate 11. The bottom 13 of each cavity 12 is connected by a series of small ports or passageways 19 with a larger port 20 having a connection by means of a pipe or conduit 21 with a vacuum or compressed air supply line so that vacuum or air pressure may be supplied to the cavity 12 through the ports 19 and 20. In like manner the recess 17 surrounding the opening 16 to the cavity 12 is connected by passageways 22 with the port 20 for simultaneous application of vacuum or pressure to the recess 17 when the cavity 12 is evacuated or pressure supplied thereto.

The uppermost molding form or die 25 comprises a base or supporting plate 26 on the lowermost face of which preform mandrels or plug assists 27 are mounted, the number thereof corresponding to the number of cavities 12 in the lowermost forming die 10. The preform mandrels 27 are fabricated of or covered with a felt or similar substantially porous material and mounted on a perforated plate 28 secured on the base plate 26 by any suitable means such as a retaining ring 30. The mandrels 27 are heated by electrical cartridges indicated at 31 or other suitable heating arrangements that may be regulated to control the temperature of the mandrels.

Each of the mandrels 27 is shaped to approximate the final form desired for the articles. Each mandrel has an end surface 32 which is somewhat less in diameter than the bottom 13 of the cavity 12. The side wall 33 is tapered to correspond to approximately the taper of the wall 14, and has a cross section at the base somewhat less in diameter than the diameter of the cavity opening 14. The side wall 33 merges into a carved out area or concave recess 34 at the base of the mandrel 27. The recess or carved out area 34 has a depth and is of a shape sufficient to space the surface thereof from the oppositely disposed surface area of the forming die 10 when the uppermost die 25 is in its lowermost position as shown in FIGURES 4 and 5. The plate 28 is mounted in the base 26 so as to provide a passageway or compartment 35 having a connection through a port 36 and connecting conduit or pipe 37 with a vacuum and/or pressure supply line. The passageways formed by the perforations 38 in the plate 28 provide a connection for suction or blow off through the walls of the porous mandrels 27.

A clamping frame 40 is provided between the lower and upper molding dies 10 and 25 for supporting the plastic web or sheet 41 in proper position between the dies for the molding operations. The dies 10 and 25 are mounted for movement relative to the clamping frame 40 and to each other, but transverse movement of the frame 40 itself or the plastic sheet 41 carried thereby is not contemplated.

Figure 2:
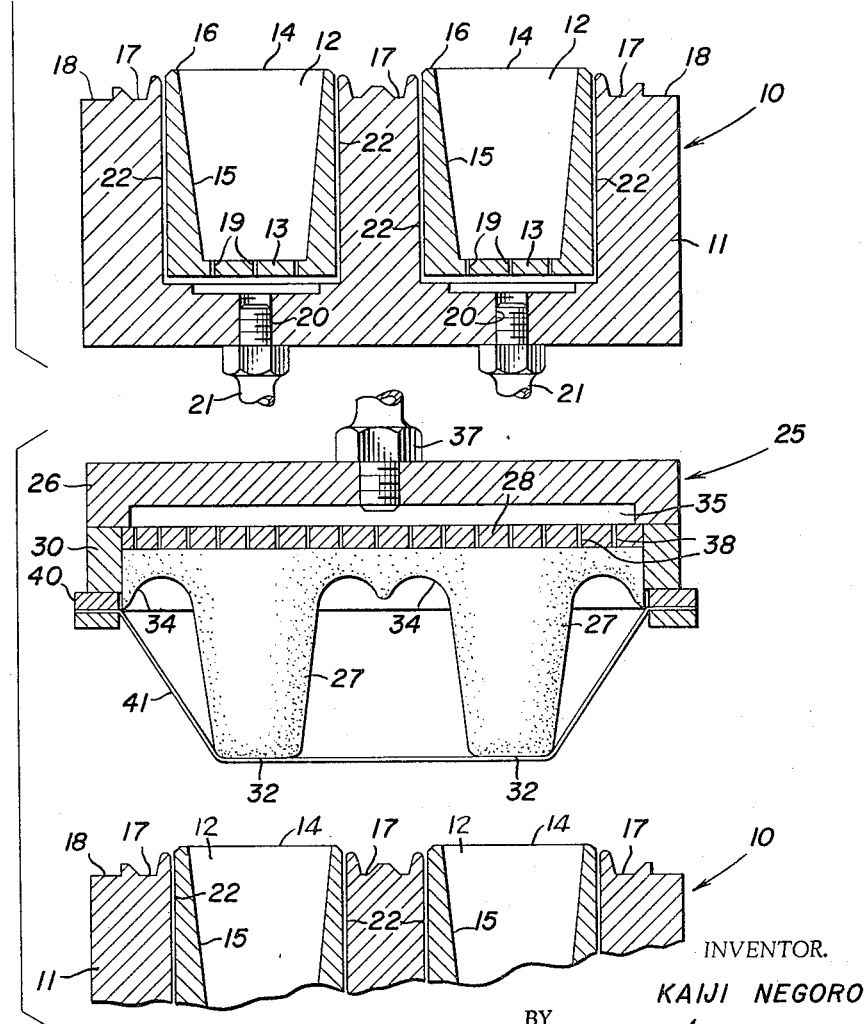
FIGURE 2 is a cross section similar to FIGURE 1 illustrating an initial step in the formation of articles by the applicant's method.

In carrying out the process of the invention, a sheet 41 of a thermoplastic resin of a suitable type, for example, polyethylene, polystyrene, cellulose acetate, nylon, polyvinyl chloride, or many other types of thermoplastic resins, is either preheated to the softening point or somewhere above the same, depending upon the characteristics of the resin, and clamped in the frame 40. Alternatively, the sheet 41 may be first clamped in the frame 40 and then heated to the proper temperature by radiant heat or the like. The upper die is first moved relative to the frame 40 to bring the mandrels 27 into contact with the topmost surface of the sheet 41 and this movement is continued until the die ring 30 engages or clamps against the sheet clamping frame 40 as shown in FIGURE 2. Suction is applied through the mandrels 27 and passageways or conduits 36, 37 and 38 to accomplish the initial shaping or draping of the sheet on the mandrels 27. The lower die assembly 10 is moved relative to the upper die assembly 25 and the sheet clamping frame 40 to position the mandrels 27 with the sheet formed thereon in the cavities 12 as shown in FIGURE 4. In this operation it should be noted that no part of the preform sheet or "Parison" touches any part of the lower die assembly 10. With the dies in the position shown in FIGURE 4, vacuum is applied through the passageways 19, 20 and 22 to strip the formed sheet from the mandrels 27 and pull the partially formed articles or shapes into the cavities 12 so as to stretch the softened resin and conform the same to the interior surfaces of the cavities 12 which determines the final form of the articles or shapes being fabricated. Alternately, air pressure may be applied to the mandrels 27 to blow the partially formed sheet into the cavities 12, and trapped air in the latter may be exhausted through the passageways 18, 20, 22 and pipe 21. Also, vacuum may be applied in the lower die 10 and air pressure applied in the upper die 25. Finally, the die assemblies 10 and 25 are retracted from engagement with the clamping frame 40 to their initial position as shown in FIGURE 1, releasing the formed sheet.

From the foregoing description, it will be observed that in all steps of the method the film is always under positive control while being transferred from the initial or preforming operation to the final reforming operation, so that no part of the film contacts the final forming mold prior to the final forming operation. In other words, the final forming operation in the mold assembly 10 is not performed in stages with consequent chilling of the film in the mold due to contact of parts of the film with parts of the mold at any time prior to the final transfer operation which occurs instantaneously.

While particular materials and specific details of construction have been referred to in describing the applicant's method and the apparatus illustrated for practicing the same, it will be understood that other materials and equivalent structural details may be resorted to within the spirit of the invention.

I claim:

1. A method of fabricating deep drawn hollow articles from thermoplastic resin sheets which comprises clamping a thermoplastic sheet in a frame, softening the sheet by heating, preliminarily shaping one or more articles by drawing the softened sheet through application of differential pressure onto a male die having a shape approximating the desired final shape of the article and having external dimensions somewhat smaller than the internal dimensions of a co-operating female die, the dies being initially positioned adjacent opposite sides of the sheet and the male die having a recess in the area which is in oppositely disposed spaced relation relative to the rim of the co-operating female die when the male die is fully inserted in the female die and into which recess a portion of the softened sheet is drawn, moving the male and female dies relative to each other to position the portion of the sheet for forming the article in the cavity in the female die while it is supported on the male die, with the preliminarily formed sheet including the portion thereof which has been drawn into the recess in the male die being held out of contact with the rim of the female die so as to avoid premature chilling which would result in non-uniform stretching of the article forming portion of the sheet, forcing the still soft sheet into contact with the interior wall defining the cavity in the female die by differential pressure so as to effect substantially instantaneous transfer of all parts of the preliminarily drawn sheet, and cooling the sheet to set the resin with the article forming portion of the sheet having the final shape of the cavity in the female die.

2. Apparatus for fabricating deep drawn hollow shapes from a thermoplastic resin sheet which comprises cooperating relatively movable forming die members and means between the working faces of the die members for supporting a thermoplastic sheet in softened condition, one of said die members having a cavity therein corresponding to the final shape desired, the other one of said die members comprising a plug assist member of approximately the same shape as the cavity but of smaller dimensions, said plug assist member being formed with a peripheral recess adjacent the base thereof into which portions of the sheet are received when the sheet is preliminarily drawn on the plug assist member, said recess being located so that it is disposed in spaced relation opposite the edges of the cavity opening when the dies are moved to position the plug assist member in the cavity with the preliminarily drawn and still soft sheet supported thereon whereby all shape forming parts of the sheet are held out of contact with the cavity die member and premature chilling is prevented which could otherwise occur due to contact between the sheet and the cavity die member prior to simultaneous transfer of all the shape forming parts of the sheet to said cavity die member from said plug assist member in the final drawing operation.

References Cited by the Examiner

UNITED STATES PATENTS

| | | | |
|---|---|---|---|
| 1,531,504 | 3/1925 | Roberts | 264—93 |
| 1,590,768 | 6/1926 | Mahoney | 264—93 XR |
| 2,876,498 | 3/1959 | Nason. | |
| 2,917,783 | 12/1959 | Olson et al. | 264—92 XR |
| 2,973,558 | 3/1961 | Stratton | 264—89 |
| 2,990,581 | 7/1961 | Rowe | 264—89 |
| 3,072,964 | 1/1963 | Tilden. | |
| 3,115,677 | 12/1963 | Thiel | 264—92 |

FOREIGN PATENTS

| | | |
|---|---|---|
| 741,040 | 11/1955 | Great Britain. |
| 1,238,420 | 7/1960 | France. |

ROBERT F. WHITE, *Primary Examiner.*

M. R. DOWLING, *Assistant Examiner.*